(12) United States Patent
Hilton (10) Patent No.: US 6,189,564 B1
(45) Date of Patent: Feb. 20, 2001

(54) METERING VALVE (75) Inventor: Thomas J. Hilton, Kirkland, WA (US)

(73) Assignee: Amhi Corporation, Kirkland, WA (US)

( * ) Notice: Under 35 U.S.C. 154(b), the term of this patent shall be extended for 0 days.

(21) Appl. No.: 09/382,357

(22) Filed: Aug. 24, 1999

Related U.S. Application Data (60) Provisional application No. 60/097,736, filed on Aug. 24, 1998.

(51) Int. Cl.[7] .................................................... G05O 7/01
(52) U.S. Cl. ............................................................ 137/501
(58) Field of Search .............................. 137/501, 505.13, 137/613

*Primary Examiner*—Stephen M. Hepperle
(74) *Attorney, Agent, or Firm*—Christensen O'Connor Johnson Kindness PLLC (57) ABSTRACT

The present invention provides adjustable flow control valves 10 for controlling flow of a fluid from a fluid supply. The valves of the present invention can accurately regulate a wide range of flow rates and require a relatively small amount of torque to adjust the flow rate of the valve during operation. The valves of the present invention include a flow control component 12 and a pressure control component 14. The adjustable flow control valves of the present invention are capable of accurately regulating a wide range of fluid flow rates. The valves of the present invention possess a very high turndown ratio, preferably up to about 200:1.

14 Claims, 7 Drawing Sheets

METERING VALVE

RELATED APPLICATIONS

This application claims benefit of priority from U.S. Provisional Application Ser. No. 60/097,736, filed Aug. 24, 1998, which is expressly incorporated herein by reference.

FIELD OF THE INVENTION

The present invention relates to fluid transfer and metering, and particularly to adjustable valves for controlling the rate of fluid flow.

BACKGROUND OF THE INVENTION

Many types of equipment and industrial processes require accurate control of the flow of liquid and gaseous fluids over a broad range of fluid pressure and flow rates. It is particularly important that flow controllers for such equipment and processes be able to accurately meter fluid flow over a broad range of flow rates. One problem with many prior art valves is that the amount of torque required to adjust the valve to alter the flow rate increases proportionally to fluid pressure within the valve. This is because the fluid pressure is operating in the valve components that must be rotated during valve adjustment. As a result, adjustment can be difficult to accomplish at high pressures.

Many conventional flow control valves utilize a piston carrying a needle that acts against a spring set contained between the piston and the bottom wall of the valve chamber in which the valve seat is formed. To adjust the valve, the bias force of the piston spring set can only be adjusted from an external source, or an adjustable valve seat has to be provided. An improvement on such valves is provided in the metering valve of U.S. Pat. No. 5,427,139 to Hilton, the disclosure of which is hereby incorporated by reference. This valve overcomes some shortcomings of conventional valves by including an adjustable floating piston and needle assembly that provides for adjustment against internal differential pressure independent of the total system pressure.

While representing an advance in adjustability and metering accuracy, the Hilton '139 metering valve maintains its highest degree of accuracy of flow regulation only in a narrow range. Hardware modifications are required to operate in other ranges with the same degree of accuracy.

An industry-recognized measure of the ability of a valve to control flow rate over a range of flow rates is the "turndown ratio". Thus, if a valve has a "turndown ratio" of 10:1 and is capable of accurately regulating a maximum flow rate of 100 liters per hour, then the smallest flow rate that the valve can accurately regulate is 10 liters per hour (i.e., one tenth of the maximum flow rate). Typically, the "turndown ratio" of prior art valves is from about 4:1 to about 10:1. Thus, there is a need for a valve that can accurately regulate a wide range of fluid flow rates and that requires a relatively small amount of torque to adjust the flow rate of the valve during operation.

It is also desired to have a metering valve that is not unduly sensitive to pressure fluctuations in the system. This is particularly the case for downstream pressure fluctuations that may induce a sinusoidal flow rate fluctuations in conventional valves.

SUMMARY OF THE INVENTION

The present invention provides adjustable flow control valves for controlling flow of a fluid from a fluid supply. The valves of the present invention can accurately regulate a wide range of flow rates and require a relatively small amount of torque to adjust the flow rate of the valve during operation. The valves of the present invention include a flow control component and a pressure control component. The flow control component includes (I) a housing defining a valve chamber having a first end and a second end, an inlet port opening into the first end of the valve chamber for placing a fluid supply in fluid communication with the valve chamber, and an outlet port for fluid flow to exit from the second end of the valve chamber; (II) a floating piston slidably mounted within the valve chamber between the inlet and outlet ports; (III) a passage connecting the valve chamber first end and valve chamber second end; (IV) a valve seat disposed within the housing in the second end of the valve chamber, upstream of the outlet port; and (V) a valve member carried by the floating piston. Preferably the valve member is selectively positionable relative to the piston and to the valve seat in order to restrict or facilitate fluid flow through the outlet port. The flow control component preferably includes a biasing spring disposed within the valve chamber second end to bias the floating piston toward the valve chamber first end. The pressure control component includes: (I) a housing defining a valve chamber having a first end and a second end, a first inlet port opening into the first end of the valve chamber for placing a fluid supply in fluid communication with the valve chamber, a second inlet port for placing the valve chamber second end in fluid communication with the outlet port in the valve chamber second end of the flow control component, and an outlet port for fluid flow to exit from the second end of the valve chamber to a downstream fluid destination; (II) a floating piston slidably mounted within the valve chamber between the first inlet port and the outlet port; (III) a valve seat included in the housing in the second end of the valve chamber, upstream of the outlet port; and (IV) a valve member carried by the floating piston. The pressure control component preferably includes a biasing spring disposed within the valve chamber second end to bias the floating piston toward the valve chamber first end.

In a first preferred embodiment of the adjustable flow control valve of the present invention, the valve member of the flow control component is mounted within an internal passage of the piston for selective advancement within the internal passage relative to the piston. Advancement of the valve member within the piston determines the position of the valve member relative to the valve seat to control the rate of flow of fluid through the valve chamber. A rotatable valve shaft has a work end external of the housing and a keyed engaging end passing through the housing into the first end of the valve chamber. The keyed engaging end of the valve shaft is slidably engaged with a keyed engaging surface defined by the valve member. The valve shaft rotates within the housing, and drives rotation of the valve member to translate the valve member within the piston. Selective rotation of the valve shaft causes advancement of the valve member within the internal passage of the piston to adjust the rate of flow of fluid through the valve chamber. The passage connecting the valve chamber first end and the valve chamber second end is defined through the piston, radially offset from the valve member. An orifice assembly is mounted within this passage. Alternately, the passage connecting the first and second ends of the valve chamber can be formed axially through the valve member, or can be formed in the wall of the valve housing.

In a second preferred embodiment, the piston in the flow control component carries a non-adjustable valve member and the orifice assembly. The valve member carried in the piston of the pressure control section is adjustable with a valve shaft.

In a third preferred embodiment, neither the piston in the flow control section nor the piston in the pressure control section includes an adjustable valve member. Rather than being carried in the piston of the flow control section, an external orifice is provided in a passage placing the first and second ends of the chamber of the flow control section in fluid communication. This orifice, which may be placed in a passage within the chamber housing or externally thereof, is adjustable.

In a fourth preferred embodiment, the valve members carried in the pistons of both the flow control and pressure control sections are adjustable.

The adjustable flow control valves of the present invention are capable of accurately regulating fluid flow rates of from about two liters per hour to about 1000 gallons per day for the first preferred embodiment summarized above, and up to 15,000 gallons per day for the third preferred embodiment summarized above. These flow rates are provided for illustration only, and values in accordance with the present invention may be scaled up or down to handle other flow rates. Preferably, once a valve of the present invention has been adjusted to permit a desired flow rate, the valve is capable of maintaining the flow rate with an accuracy of plus or minus about 7%, preferably plus or minus about 3%, more preferably plus or minus about 1%.

Thus, the valves of the present invention are capable of accurately controlling flow rate over a wide range of flow rates. It is a feature of the valves of the present invention that they possess a very high turndown ratio, preferably up to about 100:1, more preferably up to about 200:1.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
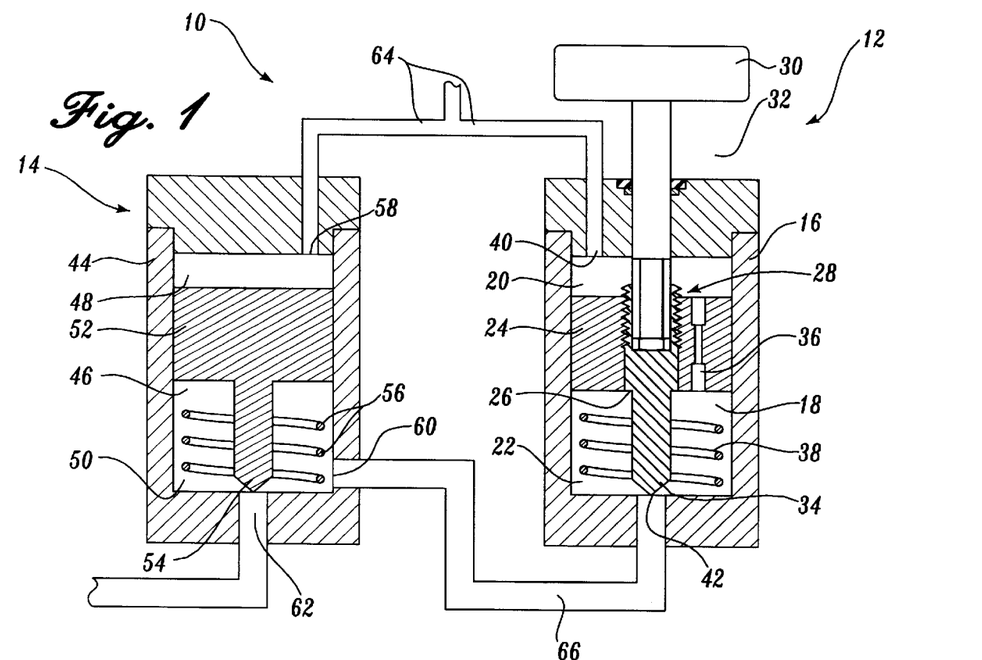
FIG. 1 shows a schematic view of a first preferred embodiment of the adjustable flow control valves of the present invention.

As shown schematically in FIG. 1, a first preferred embodiment of the adjustable flow control valve 10 of the present invention includes a flow control component 12 and a pressure control component 14. Flow control component 12 includes a housing 16 that defines a valve chamber 18 including an upper portion 20 and a lower portion 22. Valve chamber 18 receives a floating piston 24 that defines a central bore 26 for receiving a valve member 28 selectively positioned by a rotatable adjustment handle 30. The adjustable handle 30 includes a keyed shaft 32 that slidably engages a keyed aperture in the valve member 28 to threadedly advance the valve member 28 within the piston 24, thereby longitudinally repositioning a needle 34 carried on the end of the valve member 28 needle. Piston 24 also defines a jet 36 that places valve chamber upper portion 20 in fluid communication with valve chamber lower portion 22. Spring 38, such as a stack of belleville washers, is disposed within valve chamber lower portion 22. Flow control component housing 16 also defines a fluid inlet port 40 and a fluid outlet port 42.

Pressure control component 14 includes a housing 44 that defines a valve chamber 46 including an upper portion 48 and a lower portion 50. The term "upper" is used to refer to the end proximate handle 30, and "lower" to the opposite end, for ease of understanding. However, it should be understood that the valve of the present invention can be used in any orientation. Pressure control component valve chamber 46 receives a floating piston 52 that includes a needle 54. Spring 56, such as a stack of belleville washers, is disposed within valve chamber lower portion 50. Pressure control component housing 44 also defines a first fluid inlet port 58, a second fluid inlet port 60 and a fluid outlet port 62. A bifurcated fluid inlet conduit 64 is connected to both flow control component fluid inlet port 40 and pressure control component fluid inlet port 58. A connecting fluid conduit 66 connects flow control component fluid outlet port 42 with pressure control component second fluid inlet port 60.

Briefly, in operation fluid enters bifurcated fluid inlet conduit 64 from a fluid supply source, and fluid flow is directed to both valve chamber upper portion 20 of flow control component 12 and to valve chamber upper portion 48 of pressure control component 14. Fluid flows from valve chamber upper portion 20 of flow control component 12 to valve chamber lower portion 18 of flow control component 12 through orifice passage 36. The force of the fluid entering valve chamber 18 and valve chamber 46 applies fluid pressure to floating piston 24 and to floating piston 52 which are pushed downwardly to compress spring 38 and 56, respectively, thereby carrying needles 34 and 54 closer to complementary seats defined in fluid outlet port 42 and fluid outlet port 62, respectively. The degree of slidable movement downward of floating piston 24 and floating piston 52 is proportional to the fluid pressure applied thereto. Higher pressures result in more movement of floating piston 24 and floating piston 52, and thus a decrease in the gap between valve needle 34 and the seat defined in fluid outlet port 42, and between valve needle 54 and the seat defined in fluid outlet port 62, while lower pressures result in a larger gap, thereby regulating fluid flow through fluid outlet port 42 and fluid outlet port 62 at a constant level. Fluid flows from valve chamber lower portion 22 of flow control component 12 to valve chamber lower portion 50 of pressure control component 14 through connecting fluid conduit 66.

The downward motion of flow control component piston 24 is resisted by spring 38 and by a back pressure, within lower portion 22 of flow control component valve chamber 18, that is generated by the downward motion of pressure control component floating piston 52. As pressure control component floating piston 52 moves downwards under the force of fluid entering pressure control component valve chamber upper portion 48, fluid within pressure control component valve chamber lower portion 50 is compressed, thereby generating a back pressure that is transmitted to valve chamber lower portion 22 of flow control component 12 through connecting fluid conduit 66. Similarly, spring 56 and the force of fluid entering valve chamber lower portion 50 of pressure control component 14 combine to resist the downward motion of pressure control component piston 52.

The pressure range within which valve 10 operates can be determined by appropriately selecting spring 38 and 56 that offer a desired amount of resistance to the downward motion of pistons 24 and 52. For example, spring washers having desired spring constants can be utilized as spring 38 and 56. Pressure control component 14 serves as the principal pressure regulator, while flow control component 12 permits fine adjustments to be made to the operable pressure range.

Fine adjustment of the operable pressure range of valve 10 is made by means of valve member 28. Valve member 28 is advanceable within floating piston 24 by rotation of rotatable handle 30 and shaft 32, thereby repositioning valve member 28 within piston 24 to adjust the gap between needle 34 and the seat defined in fluid outlet port 42 thus controlling the rate of fluid flow therethrough.

Additionally, pressure control component 14 serves to substantially isolate flow control component 14 from changes in pressure transmitted to valve 10 from a downstream component of a fluid flow system that includes valve 10. Consequently, valve 10 is capable of accurately controlling fluid flow even in the presence of downstream system perturbations.

Valve 10 is a differential pressure regulator, maintaining a substantially constant differential between the inlet pressure (at conduit 64) and the intermediate system pressure (at conduit 66), i.e., between the flow control section and the pressure control section. A momentary change in inlet pressure will result in only a short duration change in fluid flow rate through valve 10, which is rapidly equalized.

The pressure control component 14 acts as a dampener to compensate substantially for pressure changes isolating the flow control piston 24 from such changes and maintaining a constant intermediate system pressure. Sinusoidal flow variations due to downstream pressure perturbations are avoided. Pressure drop across the orifice passage 36 is accurately controlled, enabling use of a simple drilled orifice rather than more expensive traditional control orifices, although conventional orifices can be utilized if desired.

Figure 2:
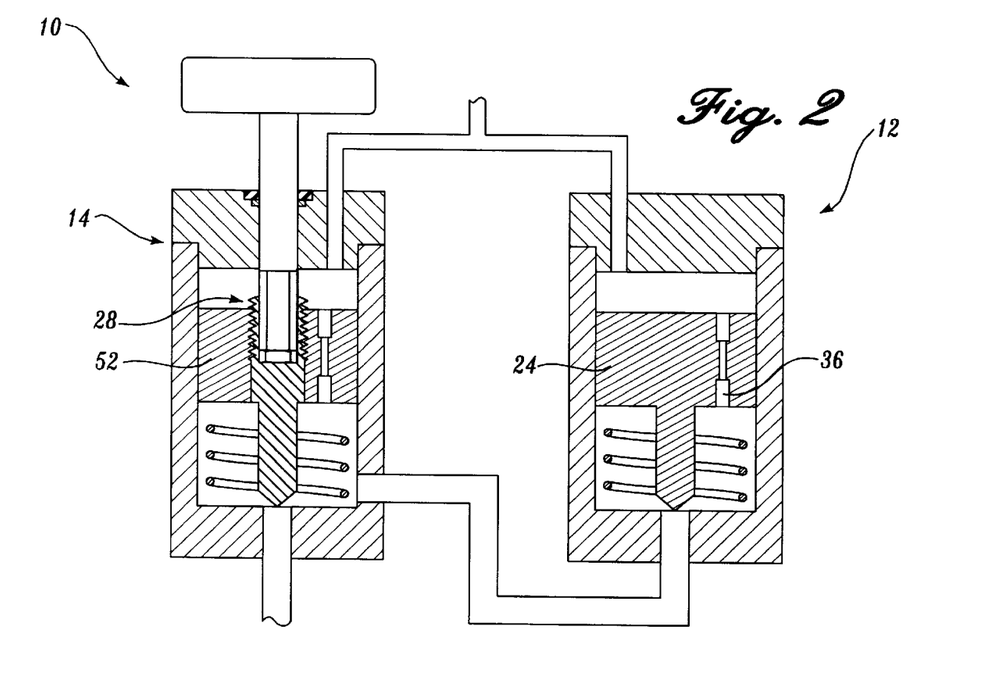
FIG. 2 shows a schematic view of a second preferred embodiment of the adjustable flow control valves of the present invention.

FIG. 2 shows a schematic representation of second preferred embodiment of adjustable flow control valve 10 of the present invention. The second preferred embodiment is identical to the first preferred embodiment, except that adjustable valve member 28 is disposed within floating piston 52 of pressure control component 14 35 instead of being disposed within floating piston 24 of flow control component 12. While suitable over a smaller flow rate range, this embodiment is not as preferred as the first embodiment, which is useful over a larger flow rate range.

Figure 3:
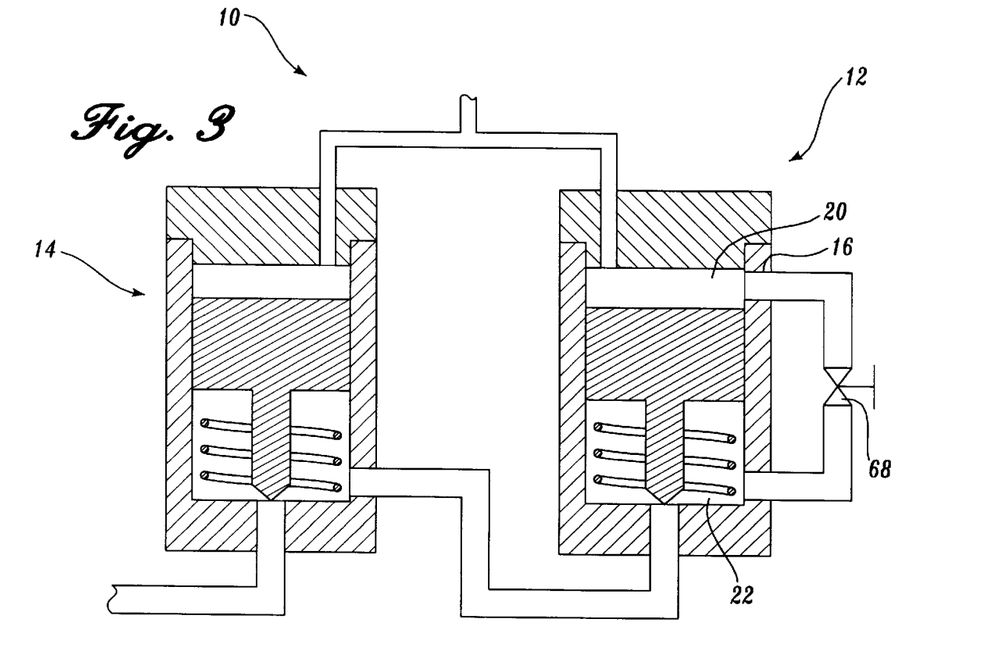
FIG. 3 shows a schematic view of a third preferred embodiment of the adjustable flow control valves of the present invention.

FIG. 3 shows a schematic representation of a third preferred embodiment of the adjustable flow control valve 10 of the present invention. The third preferred embodiment is similar to the first and second preferred embodiments except that flow control component 12 includes an external adjustable orifice valve 68, connecting valve chamber upper portion 20 and valve chamber lower portion 22, located external to housing 16 of flow control component 12. ° Che external adjustable orifice valve 68 serves the function of the orifice passage 36 of the first preferred embodiment. This arrangement is not as accurate as the first preferred embodiment at low flow rates, but allows operation at higher flow rates.

Figure 4:
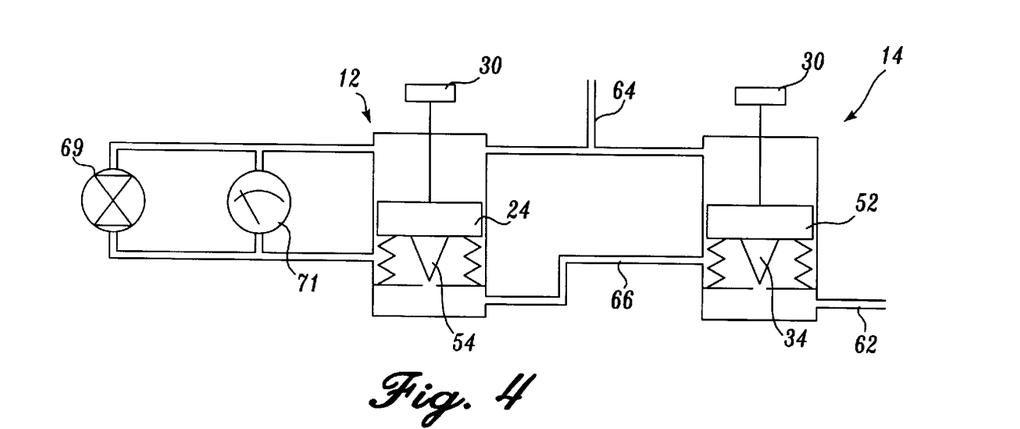
FIG. 4 shows a schematic view of a fourth preferred embodiment of an adjustable flow control valve of the present invention.

FIG. 4 illustrates a fourth preferred embodiment of the present invention, which combines the features of the first three embodiments. Thus each of the pistons, 24, 52 of the flow control component 14 and pressure control component 12, respectively, carries an adjustable valve member operated on by a handle 30. In addition, an external flow adjustment valve 69 is provided. Thus coarse flow control, fine flow control, and dampening pressure differential can all be selectively adjusted.

A gauge 71 monitors differential pressure in the system. Other combinations of the first three embodiments may likewise to configured in accordance with the present invention.

Figures 5, 6, 7:
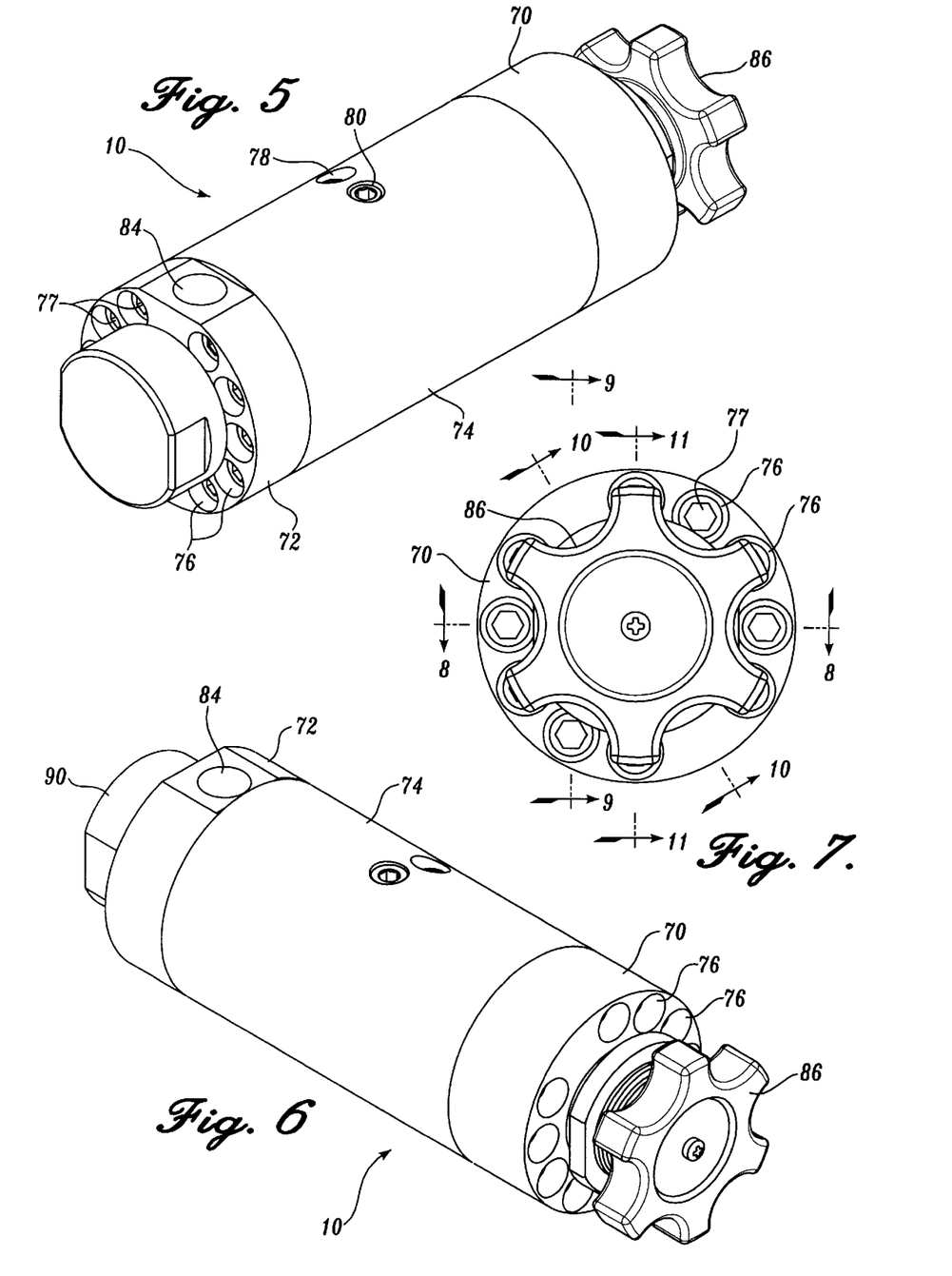
FIG. 5 shows an isometric view of the presently most preferred embodiment of the adjustable flow control valves of the present invention viewed from the lower end.
FIG. 6 shows an isometric view of the presently most preferred embodiment of the adjustable flow control valves of the present invention viewed from the upper end.
FIG. 7 shows an upper end view of the valve shown in FIGS. 5 and 6, and shows the planes of the longitudinal cross-sectional views shown in FIGS. 8–11.

The detailed construction of the first preferred embodiment will now be described, with it being understood that the remaining embodiments use similarly constructed components. As shown in FIG. 5 and FIG. 6, the presently most preferred embodiment of the adjustable flow control valve 10 of the present invention includes an upper housing 70, a lower housing 72 and an intermediate housing 74 that cooperatively house flow control component 12 and pressure control component 14.

Upper housing 70 and lower housing 72 each define a plurality of bolt holes 76 for receiving bolts 77 for securing upper housing 70 and lower housing 72 to intermediate housing 74. Intermediate housing 74 is penetrated by first access port 78 and second access port 80. Intermediate housing 74 is also provided with an inlet port 82 (shown in FIG. 9). An outlet port 84 is defined by lower housing 72 and penetrates lower housing 72 at an angle of approximately 90° relative to the direction of penetration of inlet port 82. Valve 10 further includes a manually operable knob 86 secured to a rotatable adjustment shaft 88 (shown in FIG. 8) that opens through upper housing 70 into the interior of valve 10. Lower housing 72 is provided with an access cover 90 for providing access to pressure control component 14.

As used herein throughout, the terms "lower" and "bottom" refer to the end of valve 10 closest in proximity to outlet port 84, while the terms "upper" and "top" refer to the opposite end of valve 10 closest to manually adjustable knob 86. These identifiers are used for convenience in aid of understanding the disclosures contained herein; however, it should be apparent to those skilled in the art that valve 10 can be used in any physical orientation.

FIG. 7 shows an upper end view of the presently most preferred embodiment of the adjustable flow control valve 10 of the present invention.

FIG. 7 shows the planes of the longitudinal cross-sectional views shown in FIGS. 8–11.

Figure 8:
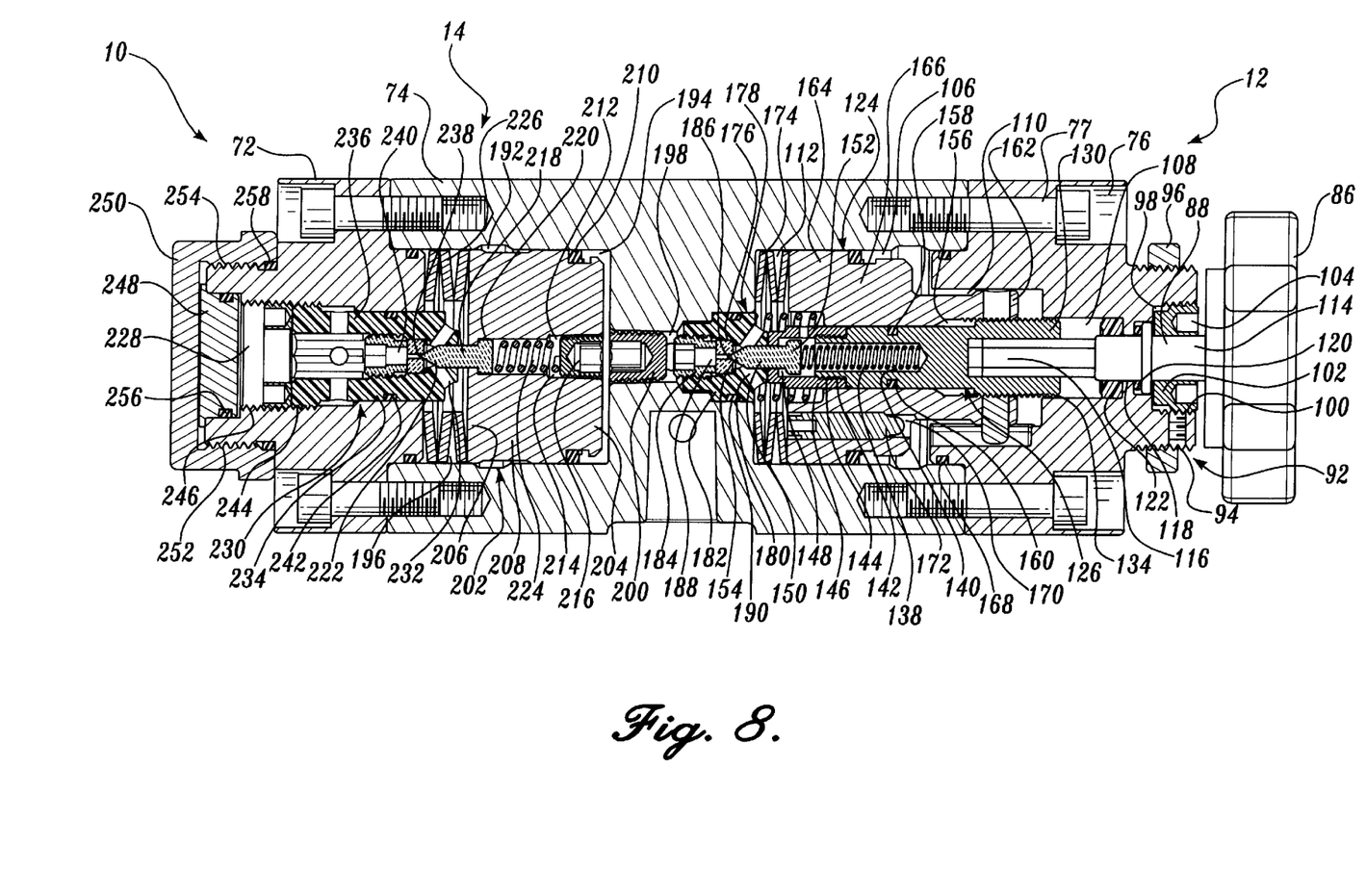
FIGS. 8–11 show longitudinal cross-sectional views of the presently most preferred embodiment of FIGS. 1 and 5–7.

Referring now to FIG. 8, upper housing 70 includes a neck portion 92 having an externally threaded surface 94 for threadedly engaging mount ring 96 used to securely mount valve 10 to a support surface. Upper housing neck portion 92 defines a retainer chamber 98, having an internally threaded surface 100, that receives externally threaded retainer 102 which is mounted around rotatable adjustment shaft 88. Retainer 102 defines indentations 104 useful for threadedly inserting or withdrawing retainer 102 into or from retainer chamber 98. Upper housing 70, and the upper portion of intermediate housing 74, cooperatively define a flow control component valve chamber 106 including a head portion 108, a neck portion 110 and a body portion 112. Rotatable adjustment shaft 88 includes a first end 114, fixedly attached to manually operable knob 86, and a second end 116. Rotatable adjustment shaft 88 extends perpendicularly from manually operable knob 86 and penetrates valve chamber neck portion 110 through an upper housing bore 118. A rotatable adjustment shaft first seal 120 is disposed around rotatable adjustment shaft 88 immediately above bore 118, and a rotatable adjustment shaft second seal 122 is disposed around rotatable adjustment shaft 88 immediately below bore 118.

Disposed within flow control component valve chamber 106 are flow control component floating piston 124 and needle assembly 126. The needle assembly 126 serves as the aforementioned valve member 28. Rotatable adjustment shaft second end 116 is fixedly inserted within needle assembly 126 which includes a body 128, including an upper body 130 and a lower body 132. Upper body 130 bears an externally-threaded surface 134 for threadedly engaging an internally threaded surface 136 of piston 124. Lower body 132 defines spring cavity 138 which houses coil spring 140. Needle assembly lower body 132 bears an externally threaded surface 142 which threadedly engages an internally threaded surface 144 of a needle carrier sleeve 146. Needle carrier sleeve 146 defines a needle cavity 148 that houses a needle 150. Needle 150 includes a needle head 152 and a pointed tip 154. Needle head 152 is disposed within needle cavity 148.

Needle assembly 126 is disposed within needle assembly cavity 156 defined by floating piston 124. A seal is formed around needle assembly 126 by needle assembly sealing element 158 disposed within a groove 160 circumferentially disposed around needle assembly body 128.

Flow control floating piston 124 is disposed within flow control valve chamber 106. Floating piston 124 includes a first end 162, a second end 164 and a body 166. A seal is formed around floating piston body 166 by piston seal 168.

Floating piston body 166 defines jet chamber 170 which houses jet 172 that fluidly connects valve chamber head portion 108 with valve chamber body portion 112. Floating piston 124 is upwardly biased by spring washers 174 disposed within valve chamber body portion 112.

Intermediate housing 74 defines a valve seat cavity 176 for receiving flow control valve seat assembly 178. Valve seat assembly 178 includes a valve seat 180 positioned within a valve seat holder 182 which threadedly receives a valve seat retainer 184. Valve seat retainer 184 defines an outlet orifice 186 and an outlet conduit 188. A seal is formed around valve seat holder 182 by valve seat holder seal 190.

Again with reference to FIG. 8, lower housing 72 and intermediate housing 74 cooperatively define a pressure control component valve chamber 192 including an upper portion 194 and a lower portion 196. Upper portion 194 of pressure control component valve chamber 192 communicates (due to manufacturing considerations) with valve seat cavity 176 of fluid control component 12 through a bore 198, which is sealed with threaded plug 200 in operation. Disposed within upper portion 194 of pressure control component valve chamber 192 is a pressure control floating piston 202. Floating piston 202 includes a first end 204, a second end 206 and a body 208. A seal is formed around floating piston body 208 by floating piston seal 210. Floating piston body 208 defines a spring cavity 212 that extends from floating piston first end 204 to floating piston second end 206. The portion of spring cavity 212 proximate to floating piston first end 204 includes an internally-threaded surface 214 for threadedly receiving a plug 216 that seals spring cavity 212, while tip 222 projects downwardly therefrom. Spring cavity 212 receives needle 218 which includes needle head 220 and pointed tip 222. Needle head 220 is disposed within spring cavity 212. A coil spring 224 is disposed within spring cavity 212 between needle head 220 and plug 216. Pressure control component floating piston 202 is upwardly biased by a plurality of spring washers 226 disposed within valve chamber lower portion 196.

Lower housing 72 defines a valve seat cavity 228 for receiving pressure control valve seat assembly 230. Valve seat assembly 230 includes a valve seat 232 positioned within a valve seat holder 234 which threadedly receives a valve seat retainer 236. Valve seat retainer 236 defines an outlet orifice 238 and an outlet conduit 240. A seal is formed around valve seat holder 234 by valve seat holder seal 242. Valve seat assembly 230 is secured within valve seat cavity 228 by an externally-threaded portion 244 of valve seat holder 234 which threadedly engages an internally-threaded portion 246 of valve seat cavity 228. Valve seat cavity 228 is sealed at its lower end by a plug 248 which is secured in place by an end cap 250 bearing an internally threaded surface 252 that threadedly engages an externally threaded surface 254 of lower housing 72. A seal is formed around plug 248 by plug seal 256. A seal is formed around end cap 250 by end cap seal 258.

Figure 9:
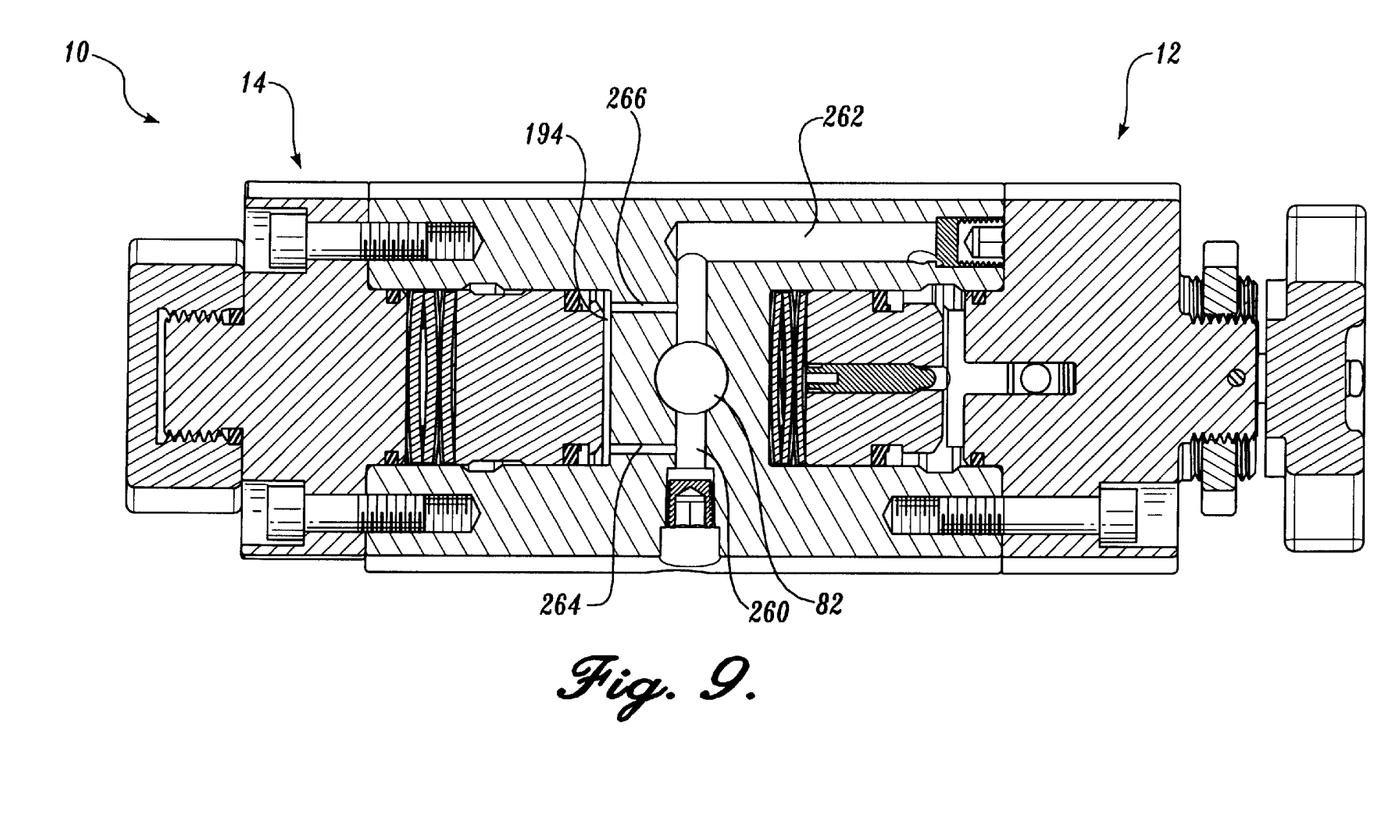
Figure 10:
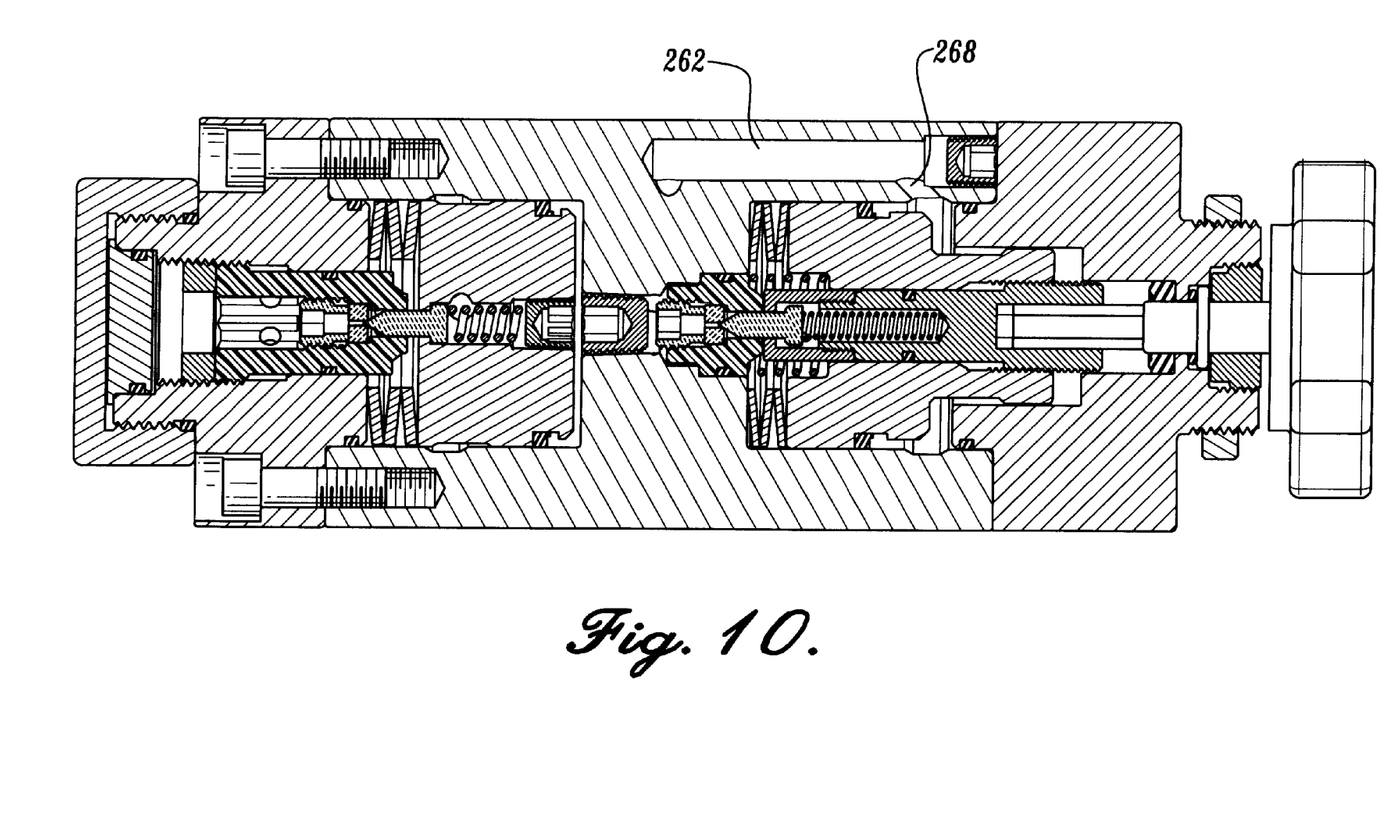

Adjustable flow control valve 10 includes a plurality of fluid conduits that define a fluid path within adjustable flow control valve 10 and thereby fluidly connect valve inlet port 82 and valve outlet port 84. As shown in FIG. 9, beginning at valve inlet port 82, an inlet conduit 260 extends (which is an off-axis longitudinal cross section) to a transverse inlet conduit 262 oriented at a right angle with respect to inlet conduit 260. Inlet conduit 260 opens into valve chamber upper portion 194 of pressure control component 14 through a first feeder conduit 264 and a second feeder conduit 266. Transverse inlet conduit 262 opens into valve chamber 106 of flow control portion 12 through valve chamber feeder conduit 268 (shown in FIG. 10).

Figure 11:
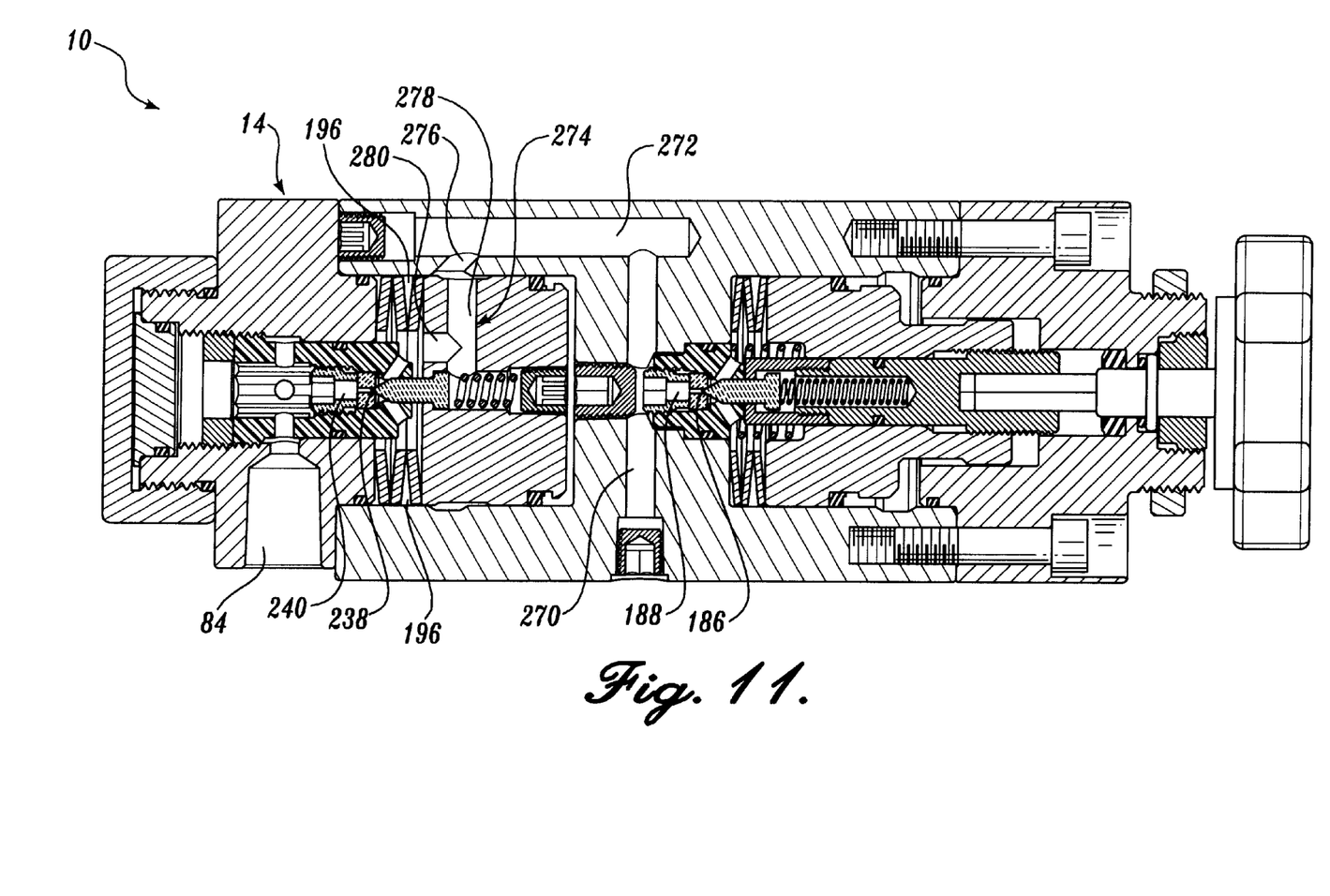

As shown in FIG. 11, flow control component valve chamber 106 is placed in fluid communication with a first connecting conduit 270 by valve seat outlet orifice 186 and valve seat outlet conduit 188. First connecting conduit 270 extends to a second connecting conduit 272 that is in fluid communication with valve chamber lower portion 196 of pressure control component 14 via a tripartite connecting conduit 274 including a first portion 276, a second portion 278 and a third portion 280. Valve chamber lower portion 196 of pressure control component 14 is connected to valve outlet port 84 by outlet orifice 238 and outlet conduit 240.

In operation, fluid enters valve 10 through valve inlet port 82 where the fluid flow is directed to both flow control component 12 and pressure control component 14. Fluid is directed to flow control component 12 through inlet conduit 260 and transverse inlet conduit 262, and enters fluid control component valve chamber 106 through valve chamber feeder conduit 268. Fluid is directed to pressure control component 14 through inlet conduit 260 and enters valve chamber upper portion 194 of pressure control component 14 through feeder conduits 264 and 266. Fluid entering flow control portion valve chamber 106 passes through jet 172 and also applies fluid pressure to floating piston 124 which is pushed downwardly to compress spring washers 174, thereby carrying needle 150 closer to valve seat 180. The degree of slidable movement downward of floating piston 124 within valve chamber 106 is proportional to the fluid pressure applied to floating piston 124. Higher pressures result in more movement of floating piston 124, and thus a decrease in the gap between valve needle 150 and valve seat 180, while lower pressures result in a larger gap. By selecting a spring with an appropriate spring constant, an increase in fluid pressure is balanced by a proportionally increased pressure drop through the resulting decreased gap between valve needle 150 and valve seat 180.

Additionally, the downward motion of floating piston 124 within valve chamber 106 is upwardly biased by a back pressure within valve chamber body portion 112 which is generated by the downward motion of pressure control component floating piston 202. As pressure control component floating piston 202 moves downwards under the force of fluid entering valve chamber upper portion 194, fluid within valve chamber lower portion 196 of pressure control component 14 is compressed, thereby generating a back pressure that is transmitted to valve chamber body portion 112 of flow control component 12 through tripartite connecting conduit 274, second connecting conduit 272 and first connecting conduit 270.

Similarly, the portion of the fluid flow that is directed to valve chamber upper portion 194 of pressure control component 14, through feeder conduits 264 and 266, pushes floating piston 202 downward to compress spring washers 226, thereby carrying valve needle 218 closer to valve seat 232. Spring washers 226 and the force of fluid entering valve chamber lower portion 196 of pressure control component 14 combine to upwardly bias the downward motion of pressure control component piston 202.

Thus, the movement of floating pistons 124 and 202 regulates the flow of fluid through valve 10 by increasing or decreasing the gap between needle tip 150 and valve seat 180, and between needle tip 218 and valve seat 232. The pressure range within which valve 10 operates can be determined by selecting spring washers 174 and spring washers 226 each having an appropriate spring constant.

Fine adjustment of the operable pressure range of valve 12 is made by means of needle assembly 126. Needle assembly 126 is advanceable within floating piston 124 by rotation of manually operable knob 86 and rotatable adjustment shaft 88, which rotatably and longitudinally advances needle assembly 126 within piston 14, thereby adjusting the gap between needle tip 154 and valve seat 180. Additionally, pressure control component 14 serves to substantially isolate flow control component 14 from changes in pressure transmitted to valve 10 from a downstream component of a fluid flow system that includes valve 10. Consequently, valve 10 is capable of accurately controlling fluid flow even in the presence of downstream system perturbations.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An adjustable flow control valve for controlling flow of a fluid from a fluid upply, comprising:
   (a) a flow control component comprising:
       (I) a housing defining a flow control valve chamber having a first end and a second end, an inlet port opening into the first end of the flow control valve chamber for placing the fluid supply in fluid communication with the valve chamber, and an outlet port for fluid flow to exit from the second end of the flow control valve chamber;
       (II) a floating flow control piston slidably mounted within the flow control valve chamber between the inlet and outlet ports;
       (III) a passage connecting the flow control valve chamber first end and flow control valve chamber second end;
       (IV) a valve seat disposed within the second end of the flow control valve chamber, upstream of the outlet port; and
       (V) a valve member carried by the flow control floating piston; and
   (b) a pressure control component comprising:
       (I) a housing defining a pressure control valve chamber having a first end and a second end, a first inlet port opening into the first end of the pressure control valve chamber for placing the fluid supply in fluid communication with the pressure control valve chamber, a second inlet port for placing the valve chamber second end in fluid communication with the outlet port of the flow control valve chamber second end, and an outlet port for fluid flow to exit from the second end of the pressure control valve chamber;
       (II) a pressure control floating piston slidably mounted within the pressure control valve chamber between the first inlet port and the outlet port;
       (III) a valve seat disposed within the second end of the pressure control valve chamber, upstream of the outlet port; and
       (IV) a valve member carried by the pressure control floating piston.

2. The valve of claim 1 wherein the valve member of the flow control component is selectively positionable relative to the flow control piston and to the valve seat between a closed position, wherein the valve member blocks the valve seat to prevent fluid flow through the outlet port, and an open position, wherein the valve member is spaced from the valve seat a selected distance to permit fluid flow through the outlet port.

3. The valve of claim 2 wherein the passage connecting the flow control valve chamber first end and the flow control valve chamber second end is an orifice passage defined through the flow control piston.

4. The valve of claim 1 further comprising a spring disposed within the flow control valve chamber second end for biasing the flow control component piston toward the second end of the flow control valve chamber, and a spring disposed within the pressure control valve chamber second end for biasing the pressure control piston toward the second end of the pressure control valve chamber.

5. The valve of claim 1 wherein the flow control piston defines a needle assembly cavity housing a needle assembly comprising a body that defines a spring cavity defining a closed end and an open end, said spring cavity housing a needle and a spring for biasing said needle, said spring being disposed between said needle and said closed end of said spring cavity.

6. The valve of claim 1, wherein a substantially constant pressure differential is maintained across the passage in the flow control component.

7. The valve of claim 1 wherein the valve member of the pressure control component is selectively positionable relative to the pressure control piston and to the valve seat between a closed position, wherein the valve member blocks the valve seat to prevent fluid flow through the outlet port, and an open position, wherein the valve member is spaced from the valve seat a selected distance to permit fluid flow through the outlet port.

8. The valve of claim 7 wherein the passage connecting the flow control valve chamber first and second ends is defined by the flow control component piston.

9. The valve of claim 7 further comprising a spring disposed within the flow control valve chamber second end for biasing the flow control piston toward the first end of the flow control chamber, and spring disposed within pressure control valve chamber second end for biasing the pressure control piston toward the first end of the pressure control chamber.

10. The valve of claim 7 wherein the pressure control piston defines a needle assembly cavity housing a needle assembly comprising a body that defines a spring cavity defining a closed end and an open end, said spring cavity housing a needle and a spring for biasing said needle, said spring being disposed between said needle and said closed end of said spring cavity.

11. The valve of claim 7, wherein the valve member of the flow control component is selectively positioned relative to the flow control piston and to the valve seat.

12. The valve of claim 1 wherein the passage connecting the flow control valve chamber first end and second end is located external to the flow control piston.

13. The valve of claim 12 further comprising an adjustable valve disposed in line with the passage.

14. The valve of claim 12 wherein the pressure control piston and the flow control component piston each define a needle assembly cavity housing a needle assembly comprising a body that defines a spring cavity defining a closed end and an open end, said spring cavity housing a needle and a spring for biasing said needle, said spring being disposed between said needle and said closed end of said spring cavity.

* * * * *

UNITED STATES PATENT AND TRADEMARK OFFICE
CERTIFICATE OF CORRECTION

PATENT NO. : 6,189,564 B1
DATED : February 20, 2001
INVENTOR(S) : T.J. Hilton

It is certified that error appears in the above-identified patent and that said Letters Patent is hereby corrected as shown below:

Item [73], column 1,
Assignee, after "Amhi Corporation," insert -- d.b.a. A&H Enterprises, --

Item [56], column 1,
References Cited (U.S. Pats), insert in appropriate numerical order the following:
-- U.S. PATENTS
    5,427,139    6/1995    Hilton
    5,494,070    2/1996    Hilton --

References Cited (U.S. Pats.), insert in appropriate numerical order the following:
--    4,462,566    7/1984    French
    5,000,220    3/1991    Eick et al. --

Column 10,
Line 57, (claim 7, line 1), "claim 1" should read -- claim 1, --

Signed and Sealed this

Sixteenth Day of October, 2001

Attest:

*Attesting Officer*

NICHOLAS P. GODICI
*Acting Director of the United States Patent and Trademark Office*